(12) United States Patent
Miyamoto et al.

(10) Patent No.: US 11,628,736 B2
(45) Date of Patent: Apr. 18, 2023

(54) SOLAR CHARGING SYSTEM AND VEHICLE

(71) Applicant: TOYOTA JIDOSHA KABUSHIKI KAISHA, Toyota (JP)

(72) Inventors: Yuma Miyamoto, Toyota (JP); Satoshi Shizuka, Nagoya (JP); Akinori Kawamura, Kazaki (JP); Takashi Fukai, Ohbu (JP); Masahiro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 17/065,647

(22) Filed: Oct. 8, 2020

(65) Prior Publication Data
US 2021/0155109 A1 May 27, 2021

(30) Foreign Application Priority Data
Nov. 21, 2019 (JP) .............................. JP2019-210338

(51) Int. Cl.
*B60L 53/51* (2019.01)
*H02J 7/35* (2006.01)
*B60L 1/00* (2006.01)
*B60L 53/62* (2019.01)
*H02J 7/00* (2006.01)

(52) U.S. Cl.
CPC ................. *B60L 53/51* (2019.02); *B60L 1/00* (2013.01); *B60L 53/62* (2019.02); *H02J 7/00712* (2020.01); *H02J 7/35* (2013.01); *B60L 2260/22* (2013.01)

(58) Field of Classification Search
CPC .. B60L 53/51; B60L 53/62; B60L 1/00; B60L 2260/22; B60L 50/60; B60L 8/003; H02J 7/00712; H02J 7/35; H02J 7/0068; H02J 7/0048; H02J 2310/46; Y02T 10/70; Y02T 10/7072; Y02T 90/12
See application file for complete search history.

(56) References Cited

U.S. PATENT DOCUMENTS

2012/0074892 A1 * 3/2012 Wu .................... B60L 8/003
320/101
2013/0320911 A1 12/2013 Kamiya et al.
(Continued)

FOREIGN PATENT DOCUMENTS

JP   H08-126208 A   5/1996
JP   2001-223377 A   8/2001
(Continued)

*Primary Examiner* — Richard Isla
*Assistant Examiner* — Johali A Torres Ruiz
(74) *Attorney, Agent, or Firm* — Oliff PLC

(57) ABSTRACT

The solar charging system according to the present embodiment includes a solar panel, a drive battery, an auxiliary system including one or more devices, and a controller that controls where to supply power generated by the solar panel. The controller determines whether the solar panel can generate power, and, upon determining that the solar panel can generate power, supplies the power from the solar panel to the auxiliary system to derive the power generated by the solar panel. Upon detecting a fact that the power generated by the solar panel is equal to or greater than a first power, the controller further supplies the power from the solar panel to the drive battery to charge the drive battery.

8 Claims, 4 Drawing Sheets

(56) References Cited

U.S. PATENT DOCUMENTS

| | | | |
|---|---|---|---|
| 2013/0342154 A1* | 12/2013 | Yamamoto | H02J 7/342 320/101 |
| 2014/0159478 A1* | 6/2014 | Ang | B60L 1/003 307/9.1 |
| 2016/0089986 A1* | 3/2016 | Maeno | B60L 58/12 320/101 |

FOREIGN PATENT DOCUMENTS

| | | | |
|---|---|---|---|
| JP | 2014036563 A * | 2/2014 |
| JP | 5673633 B2 | 2/2015 |
| JP | 2018-074678 A | 5/2018 |
| JP | 2018-088757 A | 6/2018 |
| WO | 2014/184954 A1 | 11/2014 |

\* cited by examiner

SOLAR CHARGING SYSTEM AND VEHICLE

CROSS-REFERENCE TO RELATED APPLICATION

This application claims priority to Japanese Patent Application No. 2019-210338 filed on Nov. 21, 2019, incorporated herein by reference in its entirety.

BACKGROUND

1. Technical Field

The present disclosure relates to a solar charging system mounted on a vehicle, and the vehicle.

2. Description of Related Art

Each of Japanese Unexamined Patent Application Publication No. 2018-088757 (JP 2018-088757 A) and Japanese Patent No. 5673633 (JP 5673633 B) discloses a solar system in which power generated by a solar panel is temporarily stored in a power storage device (a solar battery or an auxiliary battery), and when power equal to or greater than a certain value is stored, the stored power is supplied from the power storage device to the drive battery, such that the drive battery is charged.

SUMMARY

In the solar system described in JP 2018-088757 A, deterioration of the solar battery is restricted by changing an upper limit of state of charge (SOC) of the solar battery based on a variation tendency of a high SOC state according to the altitude of a vehicle position. Further, in the solar system described in JP 5673633 B, while the vehicle is parked, charging efficiency of the drive battery using the power generated by the solar panel is improved by temporarily storing the power generated by the solar panel in the power storage device and then charging the drive battery with the power.

In a system in which a power storage device that temporarily stores the power generated by the solar panel is not used, the power generated by the solar panel is directly supplied to the drive battery. However, a case is considered where the solar panel, influenced by solar radiation emitted thereto, cannot generate the power equal to or greater than a specified value (for example, the lowest value in an operation guarantee range) for efficient charging of the drive battery and a stable operation of components, such as relays. When the power less than the specified value is supplied to the drive battery, there is a possibility that efficient charging cannot be achieved and unexpected deterioration of component performance might occur.

The present disclosure provides a solar charging system and a vehicle that can improve charging efficiency and restrict unexpected deterioration of component performance.

A first aspect of the present disclosure is a solar charging system including a solar panel, a drive battery, an auxiliary system that includes one or more devices, and a controller configured to control where to supply power generated by the solar panel. The controller is configured to determine whether the solar panel can generate power, upon determining that the solar panel can generate power, supply the power from the solar panel to the auxiliary system to derive the power generated by the solar panel, and, upon detecting a fact that the power generated by the solar panel is equal to or greater than a first power, further supply the power from the solar panel to the drive battery to charge the drive battery.

In the first aspect, the controller may determine, when an open-circuit voltage of the solar panel is equal to or greater than a first voltage, that the solar panel can generate power.

In the first aspect, the controller may stop, upon detecting a fact that the power generated by the solar panel is equal to or less than a second power during the charging of the drive battery, the supply of the power from the solar panel to the drive battery to end the charging of the drive battery.

In the first aspect, the controller may stop, upon detecting a fact that the power generated by the solar panel is equal to or less than a third power, the supply of the power from the solar panel to the auxiliary system.

In the first aspect, the first power may be set to be equal to or greater than power of a lowest value in an operation guarantee range of the drive battery.

In the first aspect, when the solar panel can generate power equal to or greater than power needed for the controller to execute a process for supplying the power, the first voltage may be set to be equal to or greater than the open-circuit voltage appeared on an output terminal.

A second aspect of the present disclosure is a vehicle including a solar charging system. The solar charging system includes a solar panel, a drive battery, an auxiliary system that includes one or more devices, and a controller configured to control where to supply power generated by the solar panel. The controller is configured to determine whether the solar panel can generate power, upon determining that the solar panel can generate power, supply the power from the solar panel to the auxiliary system to derive the power generated by the solar panel, and, upon detecting a fact that the power generated by the solar panel is equal to or greater than a first power, further supply the power from the solar panel to the drive battery to charge the drive battery. The controller is configured to, while the vehicle is parked, supply the power from the solar panel to only the auxiliary system or from the solar panel to both the auxiliary system and the drive battery, based on the power generated by the solar panel, and, while the vehicle is not parked, supply the power from the solar panel to only the auxiliary system regardless of the power generated by the solar panel.

In the second aspect, when an open-circuit voltage of the solar panel is equal to or greater than a first voltage, the controller may determine that the solar panel can generate power.

In the second aspect, upon detecting a fact that the power generated by the solar panel is equal to or less than a second power during the charging of the drive battery, the controller may stop the supply of the power from the solar panel to the drive battery to end the charging of the drive battery.

In the second aspect, upon detecting a fact that the power generated by the solar panel is equal to or less than a third power, the controller may stop the supply of the power from the solar panel to the auxiliary system.

With each aspect of the present disclosure, it is possible to improve charging efficiency and to restrict unexpected deterioration of component performance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Hereinafter, an embodiment of the present disclosure will be described in detail with reference to drawings.

Configuration

Figure 1:
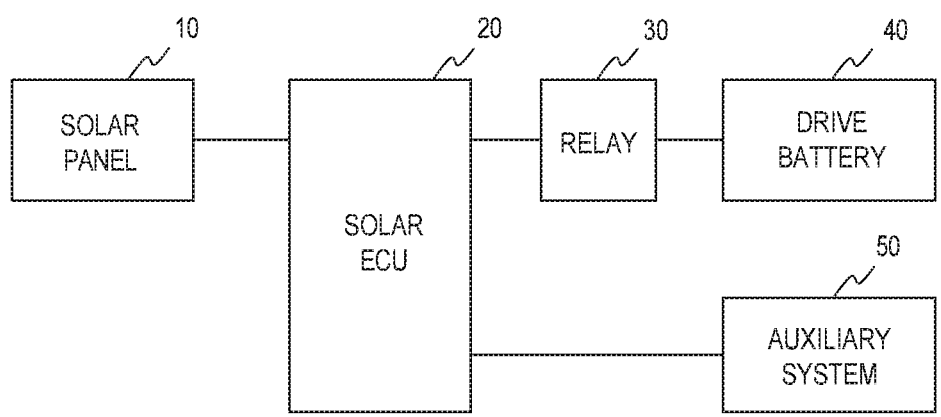
FIG. 1 is a block diagram of a solar charging system according to an embodiment of the present disclosure.

FIG. 1 is a block diagram illustrating a schematic configuration of a solar charging system 1 according to an embodiment of the present disclosure. The solar charging system 1 illustrated in FIG. 1 includes a solar panel 10, a solar electronic control unit (ECU) 20, a relay 30, a drive battery 40, and an auxiliary system 50. The solar charging system 1 according to the present embodiment can be mounted on a vehicle or the like.

The solar panel 10 is a power generator that receives solar radiation so as to generate power, and is typically a solar cell module that is an assembly of solar cells. An amount of power generated by the solar panel 10 depends on an intensity of solar radiation. The power generated by the solar panel 10 is output to the solar ECU 20. The solar panel 10 can be installed on, for example, the roof of a vehicle.

The drive battery 40 is a rechargeable secondary battery, such as a lithium-ion battery or a nickel-hydrogen battery. The drive battery 40 is connected to the solar ECU 20 via the relay 30 so as to be charged with the power generated by the solar panel 10. The drive battery 40 is connected to main equipment used for driving a vehicle (not shown), and can supply power needed for an operation of the main equipment. Examples of the main equipment can include a starter motor and an electrically driven motor.

The auxiliary system 50 is operated using the power generated by the solar panel 10 or power of a battery (not shown) in the system, and includes various pieces of auxiliary equipment mounted on a vehicle. Examples of the auxiliary equipment can include lights, such as headlamps or interior lights, air conditioners, such as heaters or coolers, and an automatic driving or advanced driving assist device.

The solar ECU 20 is an electronic control unit (ECU) that is connected to the solar panel 10, the drive battery 40, and the auxiliary system 50, respectively, and can control supply of the power generated by the solar panel 10 to the auxiliary system 50 or the drive battery 40. The solar ECU 20 functions as a controller. When supplying power, the solar ECU 20 can convert (step up/down) a generated voltage of the solar panel 10, which is an input voltage, into a predetermined voltage using a DCDC converter (not shown), and output the converted voltage to the drive battery 40 or the auxiliary system 50. Further, the solar ECU 20 can control a connection/disconnection of the relay 30.

The solar ECU 20 monitors a power generation status of the solar panel 10, and based on the power generation status obtained by monitoring, executes charging control for dynamically transiting where to supply the power generated by the solar panel 10. The power of the solar ECU 20 may be supplied from the solar panel 10 or from a power supply device, a power storage device, or the like, which is mounted on a vehicle (not shown).

The solar ECU 20 may typically include a processor, a memory, and an input/output interface. The solar ECU 20 according to the present embodiment executes the charging control when the processor reads and executes a program stored in the memory.

Control

Figure 2A:
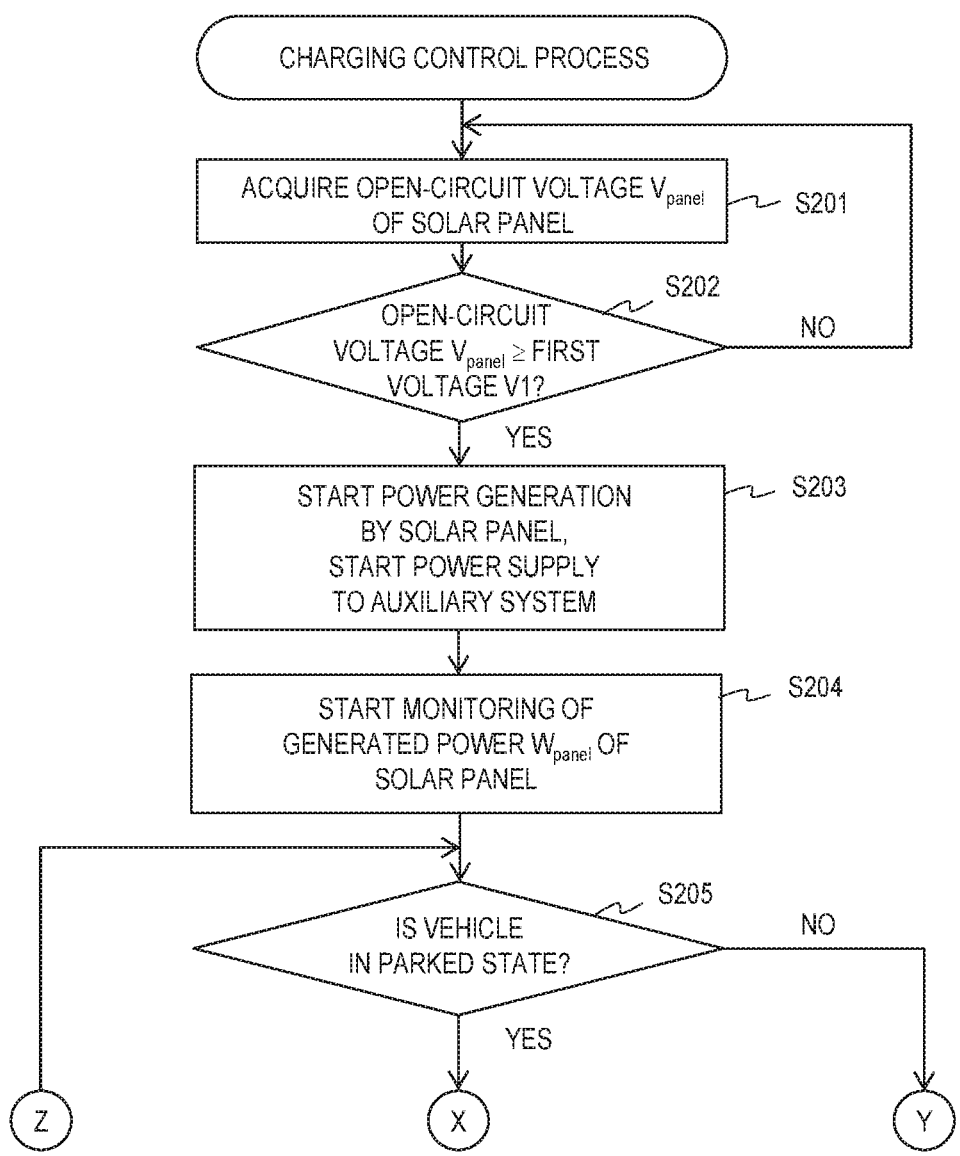
FIG. 2A is a flowchart of a charging control process executed by a solar electronic control unit (ECU)
Figure 2B:
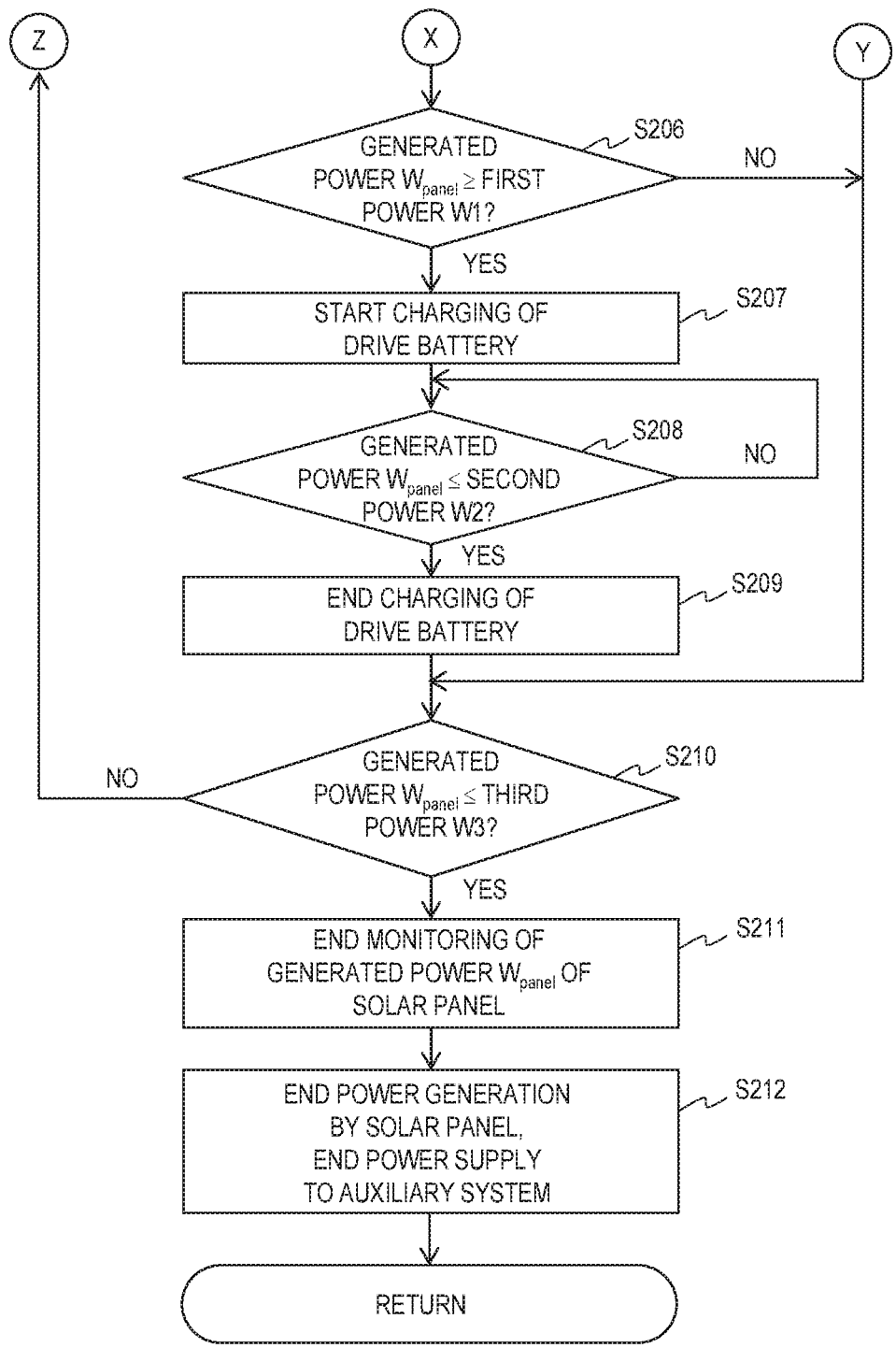
FIG. 2B is another flowchart of the charging control process executed by the solar ECU.

Next, control executed by the solar charging system 1 according to the embodiment of the present disclosure will be described with further reference to FIGS. 2A and 2B. FIG. 2A and FIG. 2B are flowcharts describing a procedure of a charging control process executed by the solar ECU 20 of the solar charging system 1. The process of FIG. 2A and the process of FIG. 2B are connected by connectors X, Y, and Z, respectively.

The charging control illustrated in FIGS. 2A and 2B is repeatedly executed while the solar charging system 1 is in operation. At the start of the charging control process, the relay 30 is in a disconnection state.

Step S201: The solar ECU 20 acquires an open-circuit voltage $V_{panel}$ displayed on an output terminal of the solar panel 10. When there is no solar radiation emitted to the solar panel 10, the open-circuit voltage $V_{panel}$ becomes zero, and when there is solar radiation emitted to the solar panel 10, the open-circuit voltage $V_{panel}$ corresponding to an amount of solar radiation is appeared on the output terminal. When the open-circuit voltage $V_{panel}$ of the solar panel 10 is acquired, the process proceeds to step S202.

Step S202: The solar ECU 20 determines whether the open-circuit voltage $V_{panel}$ of the solar panel 10 is equal to or greater than a first voltage V1 ($V_{panel} \geq V1$). The determination is made to determine whether the solar panel 10 can generate sufficient power to such a degree that efficient charging control can be executed. For example, it is not desirable that the power generated by the solar panel 10 is less than power consumed for the solar ECU 20 to operate the charging control process because, even if the solar ECU 20 starts the charging control process, power is taken out from a battery (not shown) serving as a power source. Therefore, the first voltage V1 can be set to be equal to or greater than the open-circuit voltage appeared on the output terminal when the solar panel 10 can generate power equal to or greater than power needed for the solar ECU 20 to execute the power supply process. When the open-circuit voltage $V_{panel}$ of the solar panel 10 is equal to or greater than the first voltage V1 (Yes in step S202), the process proceeds to step S203. On the other hand, when the open-circuit voltage $V_{panel}$ of the solar panel 10 is less than the first voltage V1 (No in step S202), the process returns to step S201.

Step S203: The solar ECU 20 starts power generation by the solar panel 10 and supply of the generated power to the auxiliary system 50. When the solar ECU 20 starts power generation by the solar panel 10 and power supply to the auxiliary system 50, the process proceeds to step S204.

Step S204: The solar ECU 20 starts monitoring of the generated power $W_{panel}$ actually being generated by the solar panel 10. The generated power $W_{panel}$ of the solar panel 10 can be acquired based on a closed-circuit voltage and outflow current of the solar panel 10 which are obtained by supplying power to the auxiliary system 50. When the solar ECU 20 starts the monitoring of the generated power $W_{panel}$ of the solar panel 10, the process proceeds to step S205.

Step S205: The solar ECU 20 determines whether the vehicle is in a parked state or in another state. When the vehicle is not in the parked state (for example, in a traveling state), power consumed in the auxiliary system 50 is greater than generated power $W_{panel}$ of the solar panel 10. Thus, it is more efficient to supply all the generated power $W_{panel}$ of the solar panel 10 to the auxiliary system 50. Therefore, the determination is made so as to process the charging control with high efficiency. When the vehicle is in the parked state (Yes in S205), the process proceeds to step S206. On the other hand, when the vehicle is not in the parked state (No in S205), the process proceeds to step S210.

Step S206: The solar ECU 20 determines whether the generated power $W_{panel}$ of the solar panel 10 is equal to or greater than the first power W1 ($W_{panel} \geq W1$). The determination is made to determine whether the solar panel 10 is generating sufficient power to such a degree that efficient charging of the drive battery 40 can be executed. A case is considered where the solar panel 10, influenced by solar radiation, cannot stably supply the drive battery 40 with power with which efficient charging can be executed. When inefficient power is supplied to the drive battery 40, efficient charging becomes impossible, and a stable operation of components, such as the relay 30, may be influenced and thus unexpected deterioration of component performance may occur. Therefore, the first power W1 is set to be equal to or greater than power of a specified value (for example, the lowest value in an operation guarantee range) determined for efficient charging of the drive battery and the stable operation of the components. When the generated power $W_{panel}$ of the solar panel 10 is equal to or greater than the first power W1 (Yes in step S206), the process proceeds to step S207. On the other hand, when the generated power $W_{panel}$ of the solar panel 10 is less than the first power W1 (No in step S206), the process proceeds to step S210.

Step S207: The solar ECU 20 connects the relay 30 to the drive battery 40 and supplies the power generated by the solar panel 10 thereto in parallel with the auxiliary system 50 so as to start charging of the drive battery 40. At this time, from among the generated power, the power equal to or greater than the specified value is allocated to the charging of the drive battery 40, and the remaining power is allocated to supplying power to the auxiliary system 50. When the charging of the drive battery 40 is started, the process proceeds to step S208.

Step S208: The solar ECU 20 determines whether the generated power $W_{panel}$ of the solar panel 10 is equal to or less than a second power W2 ($W_{panel} \leq W2$). The determination is made to determine whether the solar panel 10 is not generating sufficient power to such a degree that efficient charging of the drive battery 40 is executed. Therefore, the second power W2 is typically set to be equal to or greater than power of the specified value determined for efficient charging of the drive battery or the stable operation of the components. Moreover, the second power W2 may be the same as or different from the first power W1. When the generated power $W_{panel}$ of the solar panel 10 is equal to or less than the second power W2 (Yes in step S208), the process proceeds to step S209. On the other hand, when the generated power $W_{panel}$ of the solar panel 10 exceeds the second power W2 (No in step S208), the charging of the drive battery 40 is continued until the determination in step S208 becomes positive.

Step S209: The solar ECU 20 disconnects the relay 30 from the drive battery 40, stops supplying the power generated by the solar panel 10 thereto, and ends the charging of the drive battery 40. The solar ECU 20 continues to supply power to the auxiliary system 50. When the charging of the drive battery 40 is completed, the process proceeds to step S210.

Step S210: The solar ECU 20 determines whether the generated power $W_{panel}$ of the solar panel 10 is equal to or less than a third power W3 ($W_{panel} \leq W3$). The determination is made to determine whether the charging control can be efficiently executed using the generated power of the solar panel 10. In other words, the determination is made to determine whether efficient power supply to the auxiliary system 50 can be continued. Therefore, the third power W3 can be set to be less than the second power W2 and less than the power needed for the solar ECU 20 to execute the power supply process. When the generated power $W_{panel}$ of the solar panel 10 is equal to or less than the third power W3 (Yes in step S210), the process proceeds to step S211. On the other hand, when the generated power $W_{panel}$ of the solar panel 10 exceeds the third power W3 (No in step S210), the process returns to step S205.

Step S211: The solar ECU 20 ends the monitoring of the generated power $W_{panel}$ actually being generated in the solar panel 10. When the monitoring of the generated power $W_{panel}$ of the solar panel 10 is ended, the process proceeds to step S212.

Step S212: The solar ECU 20 ends the power generation by the solar panel 10 and the power supply to the auxiliary system 50. When the power generation by the solar panel 10 and the power supply to the auxiliary system 50 are ended, the process returns to step S201.

State Transition

Figure 3:
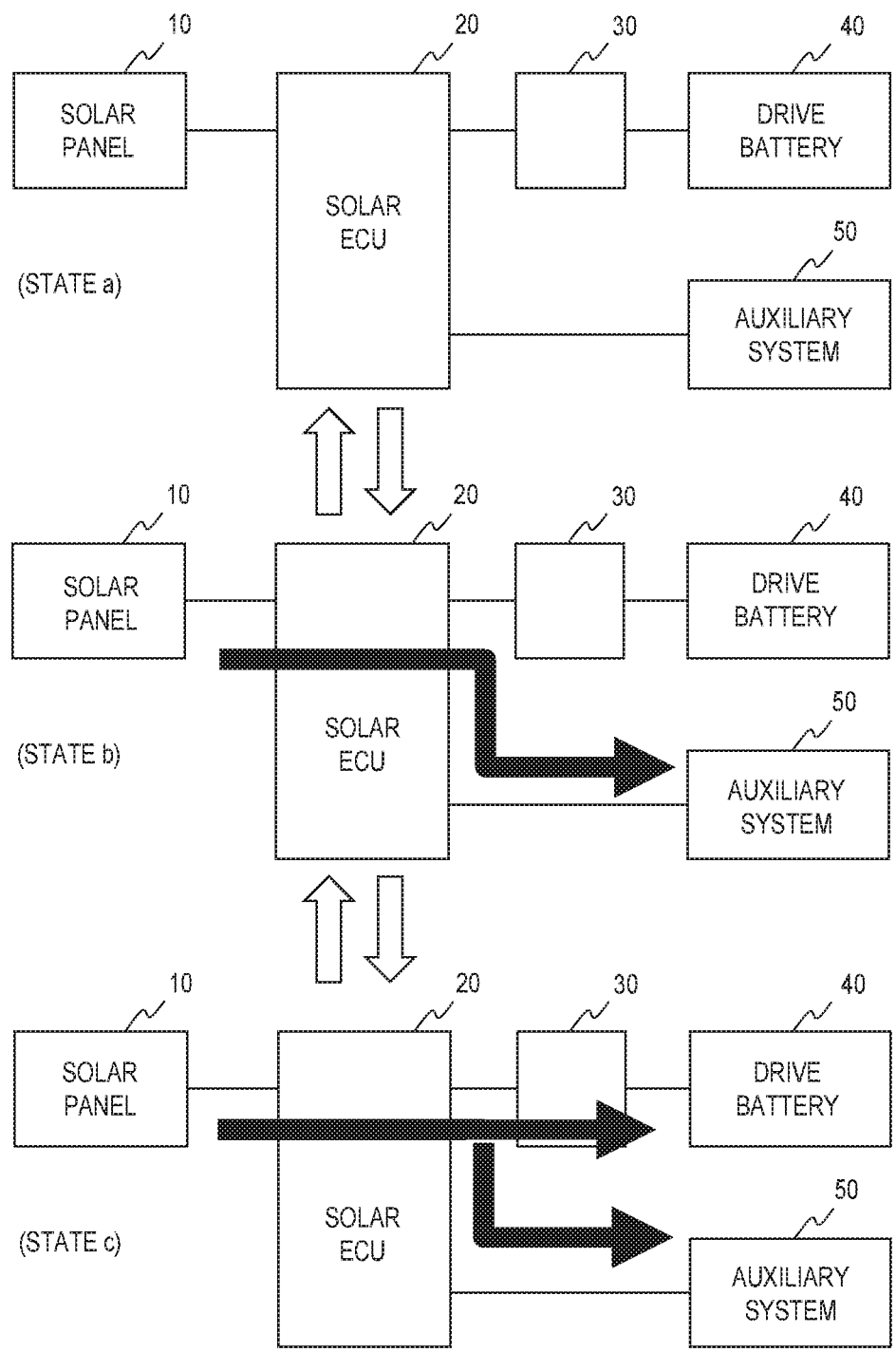
FIG. 3 is a state transition diagram illustrating supply of power generated by a solar panel.

FIG. 3 is a state transition diagram illustrating the supply of the power generated by the solar panel 10.

In steps S201 and S202 in the flowcharts of FIGS. 2A and 2B, the solar charging system 1 is in state (a) of FIG. 3. In step S203 of FIG. 2A, the solar charging system 1 transits from state (a) to state (b) of FIG. 3, and the power supply to the auxiliary system 50 is executed. Furthermore, when sufficient power can be secured in step S207 of FIG. 2B while the vehicle is parked, the solar charging system 1 transits from state (b) to state (c) of FIG. 3, and the charging of the drive battery 40 is executed in parallel with the power supply to the auxiliary system 50.

On the other hand, when power is insufficient to charge the drive battery 40, in step S209 of FIG. 2B, the solar charging system 1 transits from state (c) to state (b) of FIG. 3, and ends only the charging of the drive battery 40. Further, when power is insufficient to supply to the auxiliary system 50, in step S211 of FIG. 2B, the solar charging system 1 transits from state (b) to state (a) of FIG. 3 and ends the power supply to the auxiliary system 50 as well.

Action and Advantageous Effect

As described above, with the solar charging system according to the embodiment of the present disclosure, when the solar panel can generate power, first, power supply from the solar panel to the auxiliary system is executed to derive the power actually generated by the solar panel. When the derived power is equal to or greater than the specified value with which the drive battery can be efficiently charged, the drive battery is charged with the power generated by the solar panel.

By using the charging control, even in a system in which a power storage device that temporarily stores the power generated by the solar panel is not used, it is possible to avoid a situation where power less than the specified value determined for efficient charging of the drive battery or the stable operation of the components, such as relays, is supplied to the drive battery. As such, it is possible to improve charging efficiency and prevent unexpected deterioration of component performance.

Further, with the solar charging system according to one embodiment of the present disclosure, when the vehicle is in the parked state, it is possible to switch between only power supply to the auxiliary system, and both power supply to the auxiliary system and charging of the drive battery, as described above. As such, the power generated by the solar panel while the vehicle is traveling can be efficiently consumed by only the auxiliary system.

Although one embodiment of the present disclosure has been described above, the present disclosure is not limited to a solar charging system, but can be considered as a charging control method, a control program for the method, and a non-transitory computer-readable storage medium storing the control program, a vehicle equipped with the solar charging system, or the like.

The present disclosure can be applied to a solar charging system, such as a vehicle which utilizes power generated by a solar panel.

What is claimed is:

1. A solar charging system comprising:
   a solar panel;
   a drive battery;
   an auxiliary system including one or more devices; and
   a controller configured to control where to supply power generated by the solar panel,
   wherein the controller is configured to:
   determine whether the solar panel is able to generate power;
   upon determining that the solar panel is able to generate power, supply the power from the solar panel to the auxiliary system to derive the power generated by the solar panel;
   upon detecting a fact that the power generated by the solar panel is equal to or greater than a first power, further supply the power from the solar panel to the drive battery to charge the drive battery; and
   upon detecting a fact that the power generated by the solar panel during the charging of the drive battery is equal to or less than a second power, which is different from the first power, (i) stop the supply of the power from the solar panel to the drive battery to end the charging of the drive battery but (ii) continue the supply of power from the solar panel to the auxiliary system.

2. The solar charging system according to claim 1, wherein the controller is configured to, when an open-circuit voltage of the solar panel is equal to or greater than a first voltage, determine that the solar panel is able to generate power.

3. The solar charging system according to claim 2, wherein when the solar panel is able to generate power equal to or greater than power needed for the controller to execute a process for supplying power, the first voltage is set to be equal to or greater than the open-circuit voltage appeared on an output terminal.

4. The solar charging system according to claim 1, wherein the controller is configured to, upon detecting a fact that the power generated by the solar panel is equal to or less than a third power, stop the supply of the power from the solar panel to the auxiliary system.

5. The solar charging system according to claim 1, wherein the first power is set to be equal to or greater than power of a lowest value in an operation guarantee range of the drive battery.

6. A vehicle comprising:
   a solar charging system including:
     a solar panel;
     a drive battery;
     an auxiliary system including one or more devices; and
     a controller configured to control where to supply power generated by the solar panel,
   wherein the controller is configured to:
     determine whether the solar panel is able to generate power;
     upon determining that the solar panel is able to generate power, supply the power from the solar panel to the auxiliary system to derive the power generated by the solar panel;
     upon detecting a fact that the power generated by the solar panel is equal to or greater than a first power, further supply the power from the solar panel to the drive battery to charge the drive battery;
     upon detecting a fact that the power generated by the solar panel during the charging of the drive battery is equal to or less than a second power, which is different from the first power, (i) stop the supply of the power from the solar panel to the drive battery to end the charging of the drive battery but (ii) continue the supply of power from the solar panel to the auxiliary system;
     while the vehicle is parked, supply the power from the solar panel to only the auxiliary system or from the solar panel to both the auxiliary system and the drive battery, based on the power generated by the solar panel; and
     while the vehicle is not parked, supply the power from the solar panel to only the auxiliary system regardless of the power generated by the solar panel.

7. The vehicle according to claim 6, wherein the controller is configured to, when an open-circuit voltage of the solar panel is equal to or greater than a first voltage, determine that the solar panel is able to generate power.

8. The vehicle according to claim 6, wherein the controller is configured to, upon detecting a fact that the power generated by the solar panel is equal to or less than a third power, stop the supply of the power from the solar panel to the auxiliary system.

* * * * *